Figure 1:
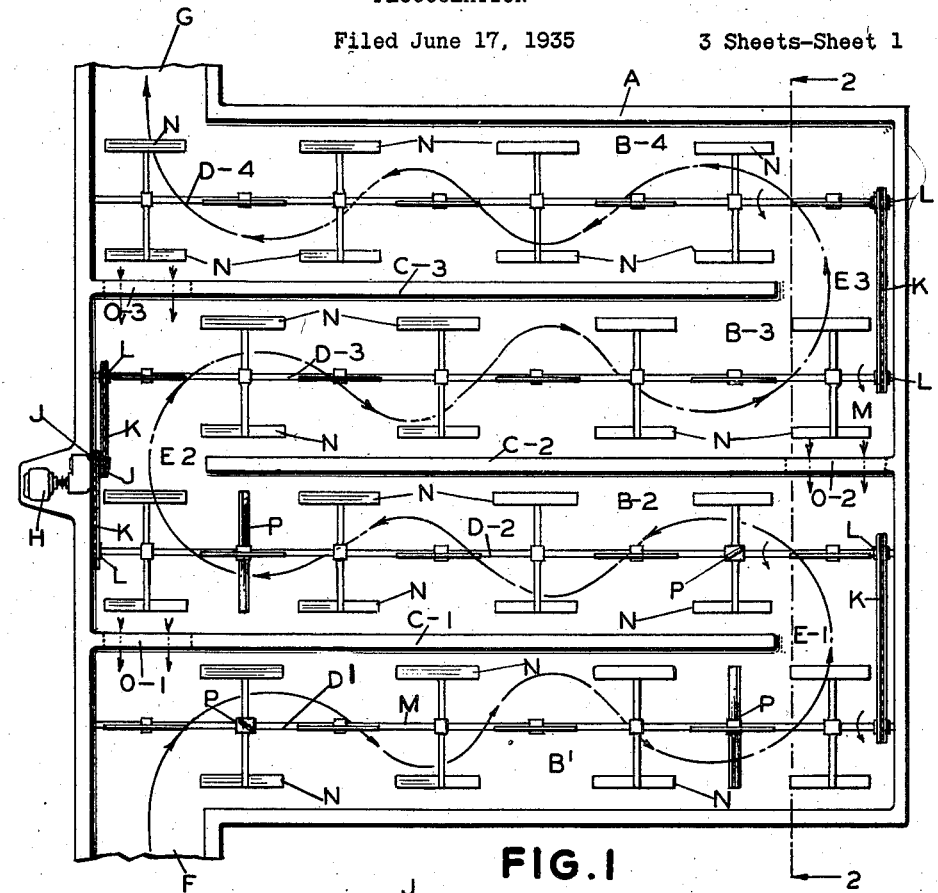

May 25, 1937.　　　G. M. DARBY ET AL　　　2,081,850
FLOCCULATION
Filed June 17, 1935　　　3 Sheets-Sheet 1

INVENTOR.
GEORGE M. DARBY
ELLIOTT J. ROBERTS
BY　WILLIAM C. WEBER
Arthur Middleton
ATTORNEY.

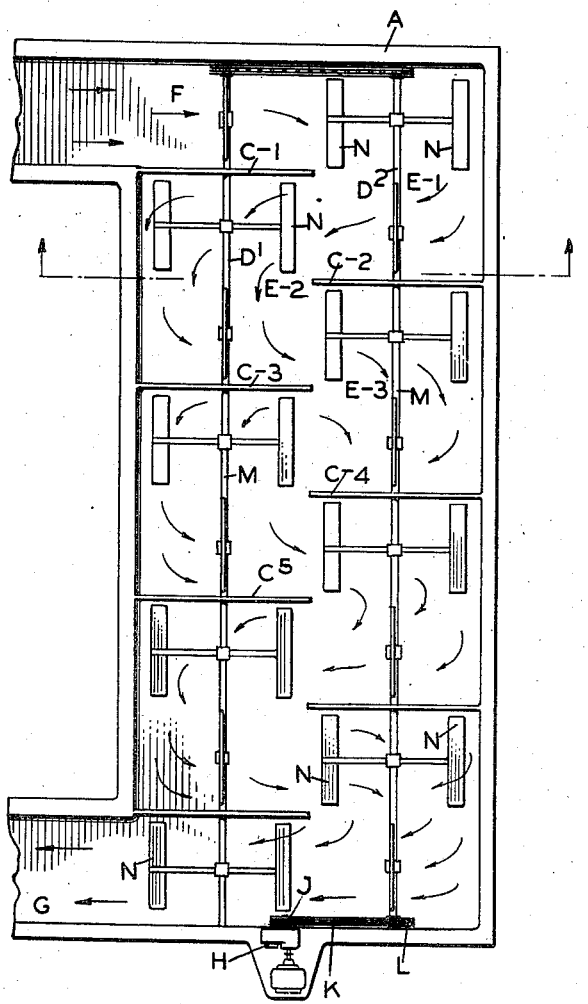
FIG.7
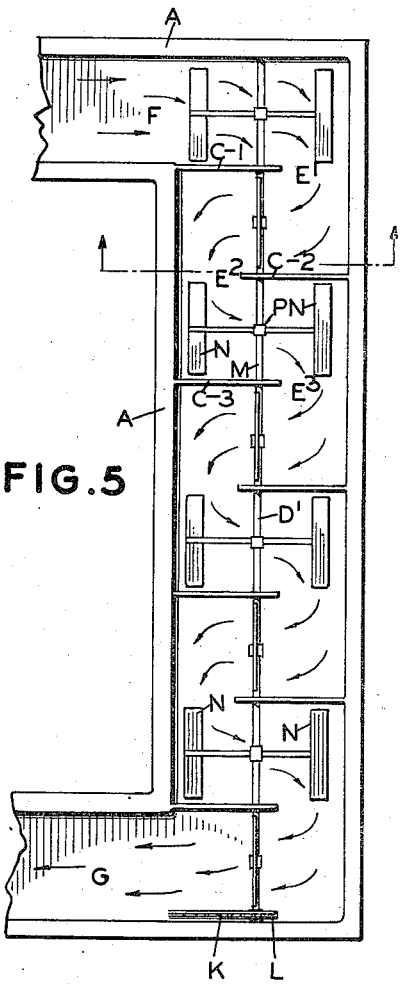
FIG.5
FIG.6
FIG.8
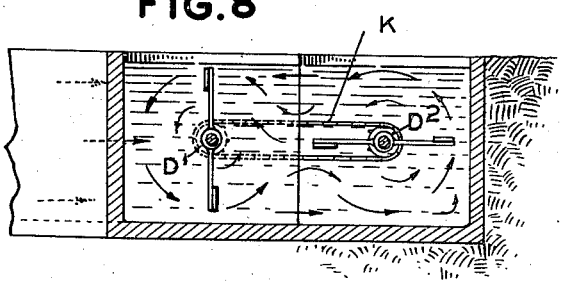
INVENTOR.
GEORGE M. DARBY
ELLIOTT J. ROBERTS
BY WILLIAM C WEBER
ATTORNEY.

May 25, 1937.　　　G. M. DARBY ET AL　　　2,081,850
FLOCCULATION
Filed June 17, 1935　　　3 Sheets-Sheet 3

INVENTOR.
GEORGE M. DARBY
ELLIOTT J. ROBERTS
BY　WILLIAM C. WEBER

ATTORNEY.

Patented May 25, 1937

2,081,850

UNITED STATES PATENT OFFICE 2,081,850

FLOCCULATION

George M. Darby and Elliott J. Roberts, Westport, Conn., and William C. Weber, Larchmont, N. Y., assignors to The Dorr Company, Inc., New York, N. Y., a corporation of Delaware Application June 17, 1935, Serial No. 27,014

13 Claims. (Cl. 210—16)

This invention relates to a method and apparatus for effecting clarification of turbid liquids by flocculation followed by sedimentation, and particularly to the step of flocculation when induced by mechanical agitation.

As otherwise expressed the invention relates generally to the treatment of liquid-solids mixtures, to wit, liquids having suspended solids therein by steps involving pre-dosing, flocculation, and sedimentation. The flocculation step is a floc conditioning operation and constitutes what may be viewed as floc coagmentation and floc amassment, it is preceded by the pre-dosing step wherein a floc formation or a floc nuclei initiating operation is carried out and which pre-dosing step includes or involves the introduction of a chemical reagent as the dosing agent into the liquid undergoing treatment and the dispersing of the chemical throughout the liquid for the realizing of a maximum floc producing or iniating action thereof preparatory to the subjecting of the thus chemically dosed and floc bearing liquid to gentle but positive agitative effects conducive to flocculation or floc conditioning to make the flocs settleable. The sedimentation step essentially involves a floc settling operation that is carried out by subjecting the liquid which has undergone the flocculation operation referred to.

Such a process that is basically directed to the treatment of liquid is the subject of the Hoover and Downes U. S. Patent 1,752,795 granted April 1, 1930 which besides the steps above mentioned also discloses the moving of sedimented solids from the sedimentation or settling operation and the returning of some of the removed sediment to the fluid or liquid undergoing agitation immediately preceding the flocculation period.

Apparatus suitable for the performing of the invention of the Hoover and Downes process Patent 1,752,795 is the subject of the Frank A. Downes Patent 1,752,789 granted April 1, 1930. Since the granting of the Hoover and Downes process patent and the Downes apparatus patent above identified, there has been developed an improved mode of treating liquid according to which turbid water after having been chemically dosed is then subjected to a mode of agitation which is novel and particularly effective in this field. The mode just referred to is the subject of the Smith Patent 1,893,451 granted January 3, 1933.

According to the mode or method described in said Smith patent, a coagulant suitable for the production of flocs is added to the liquid undergoing treatment and this is followed up by the gentle agitation of the liquid to build up these flocs into settleable floc colonies by substantially horizontally, countercurrently and unobstructedly circulating through said liquid a supply of previously formed flocs. This Smith patent, of course, shows an apparatus for carrying out the process so it is directed not only to the novel mode of treating liquid, but also to an apparatus which can be used in carrying out the method.

The Smith patent, as well as the prior mentioned Hoover and Downes patents, shows and describes both process and apparatus according to which liquids, to wit, liquid-solids mixtures are subjected to initial chemical dosing to initiate or further floc nuclei or floc formation by pre-dosing means or steps; according to which the pre-dosed liquids are subjected to gentle but positive agitation conducive to flocculation, that is, to floc coagmentation and floc amassment into floc colonies by flocculation steps or means; and according to which a settling operation for sedimenting the flocculated solids is carried out by sedimentation means or steps.

The patents identified therefore illustrate how liquid and more particularly liquids having solids in suspension therein, may be treated by adding a dosing chemical, as for example, a chemical of a type to induce or initiate floc formation and how the dosed liquid may be subjected to gentle agitative effects to further flocculation operations after which a sedimentation operation is carried out for effecting the separation of the settleable flocculated and other solids from the rest of the liquid undergoing treatment.

The present invention involves novel modes of effecting or furthering the flocculation operation that is carried out between an initial chemical dosing and a subsequent sedimentation of the flocculated liquids.

The present invention revolves about an improvement in the process and apparatus according to which the improved floc conditioning is realized between a chemical dosing step or means on the one hand and a subsequent sedimentation step or means on the other hand.

One object of this invention is to provide a degree and type of agitation most beneficial for the formation of flocs of uniform and maximum size. It is a further object to provide an arrangement of the agitating means which will result in the maximum possible contacting and detention and which will most successfully eliminate so-called short-circuiting. The invention according to one phase thereof involves the returning or transferring of formed or partially formed flocs to earlier stages of the flocculation cycle.

A main object of the invention is to provide a method and an apparatus for performing the method whereby a flocculating operation can be carried out in an efficient and simple manner and the desired end is attained by causing or by providing an arrangement according to which the liquid undergoing a flocculation operation is caused to flow along a sinuous or meandering path while it is being subjected to gentle agitative effects as produced by paddles or bladed elements moving in vertically extending planes and in closed paths about relatively horizontally extending axes located below the top surface and the bottom of the flowing liquid.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there have been illustrated the best embodiments of the invention known to me, but such embodiments are to be regarded as typical only of many possible embodiments, and the invention is not to be limited thereto.

Figure 2:
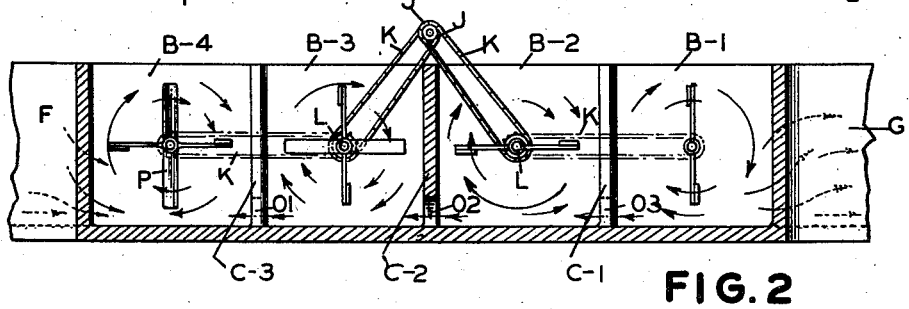

The novel features considered characteristic of my invention are set forth with particularity in the appended claims. The invention itself, however, both as to its organization and its method of operation, together with additional objects and advantages thereof, will best be understood from the following description of the specific embodiments when read in connection with the accompanying drawings in which Figs. 1 and 2 are respectively plan and vertical sectional views of a flocculating apparatus having a main tank or basin into which liquid influent enters at one end or side portion thereof and from which the liquid effluent leaves from an opposite end or side portion thereof. According to the arrangement of these figures the tank or basin is sub-divided by partial partitions having an alternating arrangement whereby the tank is sub-divided into four communicating compartments in each of which an actuating mechanism is arranged that includes a horizontally extending paddle carrying shaft that parallels the partitions. The paddles carried thereby therefore rotate about horizontally extending axes in paths defined by vertical planes. The several shafts are suitably driven as from a common source. The alternating arrangement of the partitions provides a construction according to which there is a horizontal flow of the liquid along a sinuous or meandering path between the influent and effluent sections of the apparatus. The partitions are shown provided with openings for permitting a certain amount of back-passing of formed flocs from the subsequent portion of the apparatus to a preceding portion thereof.

The sectional view of Fig. 2 is taken on a vertical plane as indicated by the line 2—2 of Fig. 1 looking in the direction of the arrows.

Figure 3:
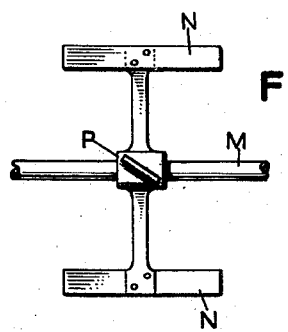
Figure 4:
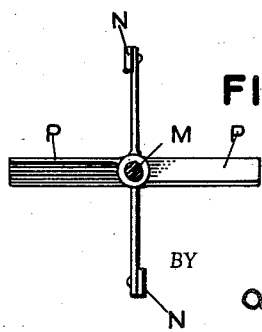

Figs. 3 and 4 are details showing the arrangement and manner in which the paddle blades are carried by and from the shafts. The details in these figures are illustrative of the paddle construction employable in the arrangement of the several figures herein referred to.

Figs. 5 and 6 are respectively plan and sectional views of a flocculating apparatus according to which, because of alternately arranged partial partitions, a sinuous or meandering flow of liquid is provided. Also, according to the arrangement of these figures a single horizontally extending shaft with a plurality of paddle sections thereupon is provided for effecting gentle agitation of the liquid as it passes along a sinuous or meandering path between the influent and effluent sections of the apparatus. The shaft of this arrangement extends at right angles to the partial partitions.

The sectional view of Fig. 6 is taken as on the vertical plane indicated by the line 6—6 of Fig. 5 looking in the direction of the arrows.

Figs. 7 and 8 are respectively plan and vertical sectional views of another form of apparatus according to which the sinuous or meandering flow path for the liquid is provided because of the alternating arrangement of partial partitions. The arrangement of Figs. 7 and 8 is quite similar to that of Figs. 5 and 6 with the exception that two sets of agitating mechanisms are provided.

Figure 9:
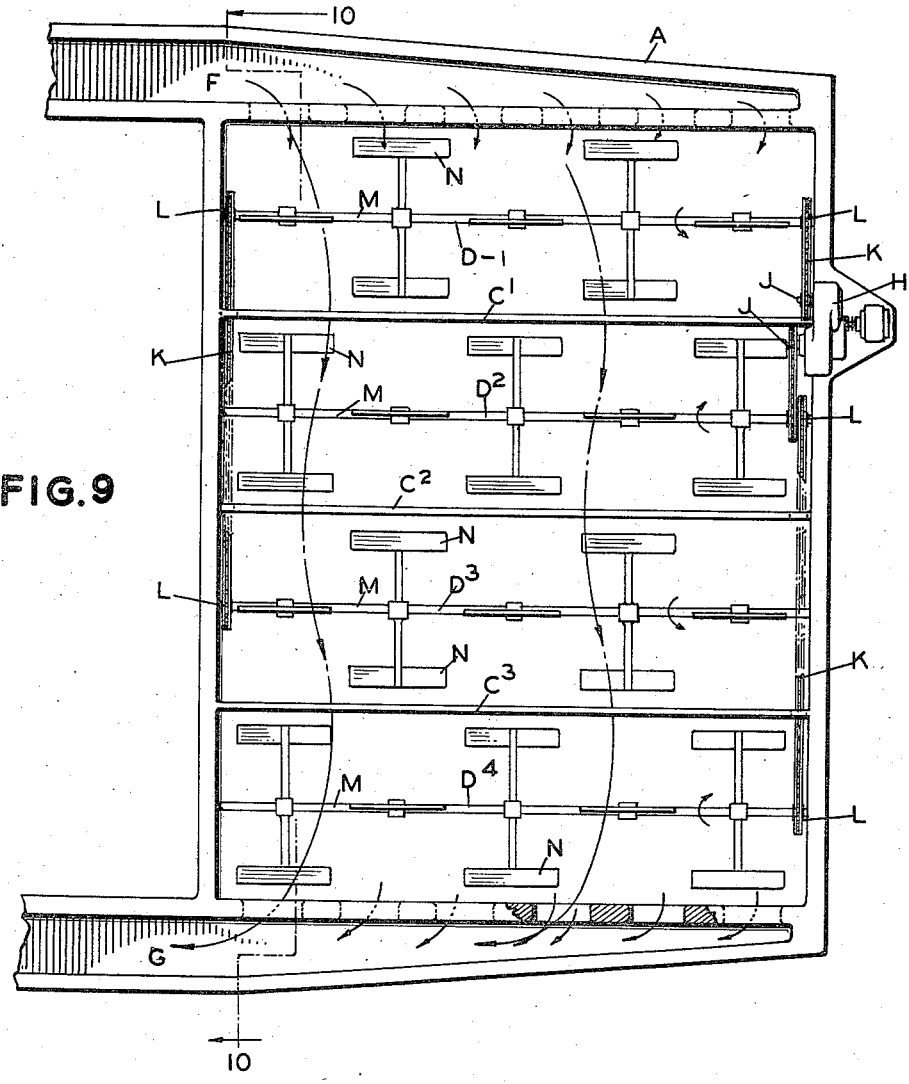
Figure 10:
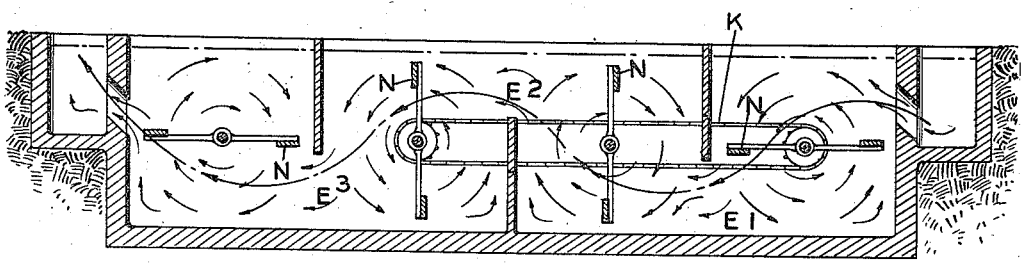

Figs. 9 and 10 are respectively plan and sectional views of a form of apparatus according to which a meandering or sinuous flow path for the liquid is insured because of an alternating arrangement of partial partitions, but in the instance of these figures the partitions extend the full width or length of the tank or basin but only for a portion of the interior height thereof. This arrangement of the partitions clearly appears in Fig. 10 which is a sectional view taken as on the vertical planes indicated by the broken line 10—10 of Fig. 9 looking in the direction of the arrows.

A detailed description of the several figures above referred to appears in subsequent portions of this specification.

Heretofore the term "coagulation" has been applied rather loosely to the entire process that includes adding chemicals to turbid fluids, inducing flocculation of the chemical precipitate, causing the chemical precipitate to agglomerate with and entrap the turbidity, and finally removing the flocculated solids by sedimentation and/or filtration. An analysis of the chemical and physico-chemical reactions involved in the various stages of such a process will be an aid to an appreciation of this invention.

Flocculation is the property exhibited by some very fine materials or colloids of aggregating or gathering together to form much larger bodies or flocs. The more or less commonly accepted theory explaining the phenomenon of flocculation assumes that colloidal or semi-colloidal solids are kept in suspension by an electric charge carried by the particles—a surface phenomenon derived by preferential adsorption of either positive or negative ions from dissociation of dissolved salts. Particles charged with like signs, either positive or negative, will be repelled and remain dispersed throughout the liquid medium in permanent suspension. In order to destroy this condition of stability and induce flocculation, it is necessary to neutralize the charge on the particles by the addition of an electrolyte or another colloid. Thereafter the particles tend to adhere, cohere or coalesce due to the natural attraction or adhesive or cohesive tendencies of similar or like types of bodies.

Many turbid fluids met with in practice already contain sufficient electrolyte although the resultant intensity of flocculation may vary considerably. In the case of very concentrated slurries flocculation is very rapid and perhaps a matter of minutes. In the case of sewage solids and the aluminum hydrate from water treatment, the time required to reach a degree of flocculation sufficient to permit the economic removal of the solids by sedimentation is more of the order of one-half to four hours or more. It has been found that the rate of flocculation is affected to a remarkable degree by the extent to which particles are mechanically brought together, in other words, by the degree of agitation, contacting, or number of impacts. In a sedimentation process or apparatus, obviously agitation to assist flocculation is impractical—if attempted in the sedimentation zone—since it would defeat sedimentation. The logical answer is a division of the operation into two separate stages, that is, flocculation and sedimentation.

The process of coagulation by addition of chemicals may be divided into three distinct stages. The first of these consists in dosing, viz. in mixing, the chemicals with the liquid, namely, the turbid water about to undergo or undergoing treatment. This chemical dosing, which preferably involves the intimate mixing or dispersing of the added chemicals with or throughout the water, should be done very rapidly and therefore requires very violent agitation with considerable turbulence. The second stage consists of a short period requisite for the chemical reaction to take place to the point where the colloidal particles of precipitate first appear. Theoretically the chemical reaction should proceed more rapidly when accompanied with violent agitation but actually there is a tendency for it to overlap the third or final stage—to wit, the stage, wherein the major portion of the aggregating of the particles or floc formation takes place—and therefore a modified degree of agitation which is less violent than that of the preceding stage should be used. After the chemical reaction has proceeded substantially to completion, the third or final stage is an aggregating or flocking together of the colloidal particles of chemical precipitate and of other fine particles in suspension to give flocs or result in floc formation of the desired size or of substantial size.

It has been found that a certain amount of stirring will accelerate flocculation under conditions permitting flocculation to take place when certain of the particles in suspension in the liquid approach to within the sphere of attraction of other particles present in suspension in the liquid. The function of this agitation is to increase the probability of collision of the suspended particles after the charges on these particles have been neutralized. If within the sphere of mass influence of a particle the mass tendency to attract another particle is greater than the repulsive tendency of similar electrical charges on the particles, a condition may be pictured according to which coagulation could be brought about by mechanical agitation alone. Agitation under such conditions must be such as to overcome the repulsive forces between the particles, forcing them within the sphere of mass attraction of one another and in this way promoting flocculation. The more nearly neutral the particles, or, as otherwise expressed, the greater the intensity of flocculation, the less will be the velocity of agitation necessary to bring about the condition mentioned.

It is of course easy to picture a condition of violent agitation such that the tendency to disintegrate the aggregates formed is greater even than the tendency for the particles to adhere to one another within the sphere of attraction. This condition would naturally prevent flocculation and represents the upper limit of degree of agitation desirable for optimum flocculation. The lower limit is that intensity of agitation which is required to keep the insoluble solids in suspension.

Chemical dosing and flocculation may be said to be complementary—the stronger the concentration of electrolyte, the stronger will be the intensity of the particles to coalesce, and if this urge is great the benefit to be derived from and the necessity of agitation may be quite negligible. On the other hand as the concentration of the electrolyte is decreased, the tendency to flocculate becomes so weak that the contacting assistance of agitation becomes a very important factor. However, in the case of flocs formed under conditions of low electrolyte concentration and prolonged agitation, the forces tending to hold the particles together are very weak and any undue agitation will tend to destroy the flocs. Therefore, in cases where flocculation by agitation is a major factor of the operation, great care must be taken to handle the flocs delicately so that they will not be subsequently destroyed. It has been found that this precaution has been neglected in most previous apparatus developed for this purpose.

Until quite recently the use of mechanical agitators in processes of flocculation and sedimentation has been confined almost entirely to the mixing of the electrolyte or precipitating chemicals with the turbid water. A great many devices have been developed especially for water softening and water treatment involving the use of mechanical agitators followed by sedimentation, but an examination of these will reveal that the function of the agitators has been confined to chemical mixing, as they provide for rapid mixing, short detention and turbulence. In water treatment plants the importance of a flocculation step between the steps of chemical dosing and sedimentation has been appreciated for many years. The most common device for this purpose is the baffled basin. There are two general types of baffled basins. The one more generally used is the under-and-over type which consists of a series of vertical passages, the water passing from the inlet to the outlet through these compartments passing over and under successive partition walls with considerable turbulence at each change of direction. In the around-the-end type the axis of flow is horizontal. A smaller number of changes in direction are required in this type but the restriction and abrupt change of direction at the ends is used to secure the desired agitation. Well defined ranges of velocity and retention period are necessary to the successful operation of this type of flocculating device.

Satisfactory operation of a baffled chamber requires that the velocity shall effect self-cleaning thereof and at the same time not be such as to destroy the flocs. The requirements of velocity and retention period impose serious limitations on the use of baffled basins as flocculating devices. Plant capacities may have a 100% seasonal variation. If reasonably high minimum velocities are chosen for low operating rates the velocities at maximum rates result in high head losses and poor flocculation. They are very inflexible.

It is believed a reference to the Langelier Patent No. 1,605,596 and to the Smith Patent No. 1,893,451 and to the operation thereof will facilitate an understanding and will lead to an early appreciation of this invention and its environment, and therefore such is incorporated at this time.

The Langelier patent shows a series of revolvable paddle agitators—revolvable about vertically extending axes—located in tanks or basins having side feed and opposite side outlet. This type of agitator is limited to small sizes and is uneconomically expensive for large capacity. The use of restricted connections between the tanks which are arranged in series, results in an increased velocity and turbulence through the inlet and outlet orifices and creates a condition which breaks down the delicately formed flocs, or at least many of them. Since the paddles will tend to swirl the entire contents of the tanks, the feed entering at the periphery will follow a circumferential course immediately to the discharge and therefore serious short-circuiting of ineffectively mixed chemicals will occur. The central part of the tank will be a more or less dead core as there is no radial mixing. Furthermore, this type of flocculator makes no provision for return of formed flocs from the later stages to the earlier stages and therefore makes flocculation much more difficult.

The Smith patent shows a type of flocculator utilizing a series of horizontal paddle mechanisms in a large rectangular tank, all having the same direction of rotation. As is specifically specified therein, this results in continuous horizontal flows along the surface of the tank and it has been found that this results in very objectionable short-circuiting. Furthermore, due to these continuous horizontal flows, planes obtain at the surface and at the bottom of the tank of a character whereby the desirable swirl condition is upset.

Maximum flocculation efficiency is obtained with a mechanism that gives a gentle swirl accompanied by a certain amount of local gentle turbulence or eddy currents. Theoretically, the desired condition is one producing the maximum differential motion between flocs or maximum scrubbing action without damaging the floc structure. By setting up a local swirl or eddies the particles are brought into collision thereby increasing the tendency to combine. A device covered by this invention consists of rotating horizontal paddle mechanisms set in long rectangular basins or compartments wherein the axes of rotation are horizontal and the planes of swirl or rotation are vertical, viz. such as are caused by paddles moving about horizontally extending axes. In conjunction with this type of mechanism the feed and discharge are at opposite ends of the basin and the general direction of flow is at right angles to the planes of rotation. The rotation of the paddles induces a circumferential velocity or force. By the arrangement of feed and discharge contemplated and the use of baffles, the hydrostatic head or force due to the feed in most of the forms of apparatus illustrated is caused to act at right angles to the plane of rotation. The result of these two forces is a series of concentric helixes. The mechanism uses a number of paddles of relatively small cross section compared with the total longitudinal cross section of the chamber. As a result, while the water will tend to swirl in the same general direction as the paddles, the paddles will slip through the water at a much higher speed. In other words, there will be considerable slip. This flow around or slippage in respect to the paddles results in the desirable turbulence and eddy currents together with particle collisions and radial mixing. It has been found that the degree of flocculation is in proportion to the number of paddle impacts, that is, a small diameter mechanism operating at a relatively high speed will give better results than a relatively large diameter unit operating at lower speeds. This is explained as due to the multiplied amount of turbulence set up around the paddle blades. We have found that best results can be obtained with paddle diameters equal to about 0.6 to 0.8 times the fluid depth and paddle speeds to give velocities of from 0.6 to 1.8 feet per second at the periphery.

By causing the liquid to travel along sinuous or meandering paths and by imparting to the liquid a spiral movement about a horizontally extending axis or axes while the liquid is flowing along said paths, a relatively long flow line is obtained and there is realized a relatively uniform detention period for all parts of the flow. This effect may be obtained by the arrangements shown in Figs. 1 and 2, 5 and 6, and 7 and 8. A similarly good result may be obtained by an arrangement as shown in Figs. 9 and 10 where, however, the lines of flow consist of touching cylinders although a certain amount of spiral flow effect is obtained due to the sidewise or horizontal displacement of the individually rotating fluid columns.

While this invention contemplates the use of horizontal paddle mechanisms very similar to those of the Smith Patent 1,893,451, it will be noted that the spiral flow effect obtained is quite different from that contemplated in the Smith patent and that furthermore the baffles or partitions which are an essential part of this invention entirely obviate any chances of short-circuiting, that they divide the flocculation into a series of successive steps, and that they are arranged so as to provide the sinuous or meandering path for the liquid thus directed or guided thereby. This imparts an important and desirable condition and substantially prevents short-circuiting. It has been found that during the earlier stages a considerably greater intensity of agitation can be used without detriment to the partly formed flocs. Obviously it is desirable to use the greatest possible intensity of agitation from the standpoint of speed of reaction. The flocs at first formed are small and compact. Thereafter they become bulkier and the aggregates are more loosely held together. It is therefore necessary to gradually decrease the intensity of agitation. Langelier in Patent 1,605,596 proposes to do this by changes in speed of the agitating device. We have found that this is wrong in principle. Increasing or decreasing the speed of rotation will increase or decrease the circumferential force or forces tending to swirl the fluid but it will not necessarily affect the intensity of agitation which is mostly a function of turbulence. This is more directly a function of the size and number of paddles. We therefore prefer to gradually decrease the number or width of the paddle blades used as the flocculation progresses.

It has been found that the process of flocculation can be greatly accelerated by returning some of the large and bulky flocs from the later stages of the flocculation reaction to the earlier stages, in other words, by a certain inoculation of the unflocculated fluid with fluid containing flocs in an advanced stage of development. It has further been found that it is better to do this in successive stages, that is, by returning from the second stage to the first, from the third to the second, from the fourth to the third, and so on, rather than, for example, by directly returning flocs from the fourth stage to say the first stage. Figs. 1 and 2 show a typical method of accomplishing this. A certain amount of this floc return will also be obtained with the arrangement shown in Figs. 7 and 8.

By using a single tank divided into compartments by suitably located baffles or partitions and by correlating the directions of rotation of associated agitating means, abrupt changes of direction and restriction of flow between successive compartments or stages can be obviated. All of the arrangements illustrated, especially those of Figs. 1 and 2, 5 and 6, and 9 and 10, illustrate this principle.

Referring to the figures, A is a basin or tank made of concrete or any other suitable material provided with a bottom and upstanding boundary walls such as side and end walls, an inlet opening F and an outlet opening G. This space is divided into a series of parallel compartments as B—1, B—2, B—3, B—4, by partitions or baffles as C—1, C—2, C—3, etc. These partitions or baffles—as the case may be—are spaced away from the sides or bottom or extreme top portion of the tank a considerable distance so as to provide communicating openings or flow passageways as E—1, E—2, E—3, etc. between the compartments B—1, B—2, etc. Each compartment is provided with a paddle agitating mechanism, or the several compartments are provided with paddle agitating mechanism, as D—1, D—2, D—3, etc. Each said paddle mechanism consists of a horizontal shaft M supporting horizontal parallel paddle blades N. The shaft M is driven through sprockets L and J and the sprocket chain K by a drive mechanism H. The drive mechanism H constitutes a power actuated motivating means by means of which the several paddles or paddle sets are simultaneously and continually actuated for an extended or indefinite period of time.

In Figs. 1 and 2, slots or openings O—1, O—2, O—3, are provided at alternate ends of the partitions near the bottom of the basin for a return flow to a preceding compartment from a following or subsequent compartment. Flow through these openings is induced by the direction of rotation of the paddles. In order to further induce such a flow, the agitating mechanism may be provided with angle blades P acting to force the liquid to a certain extent in the same general direction as the flow, to wit, by proportioning of the width of the blades, by radially positioning the same in respect to the axis, by angularly positioning the blades or some of them in respect to the axis of their paths of movement, and by providing the requisite and rotational speed for the blades and particularly for the angularly set blades. By the angularly positioning of some of the blades, any loss of hydrostatic head due to frictional resistance to flow can be overcome and in fact a slight positive pressure can be obtained if necessary so that a positive flow will occur through the submerged openings O—1, O—2, O—3, etc.

The conditions obtained with flocculating devices arranged for the return of flocs from a subsequent to a preceding stage of the flocculation process, as for example by the device of Figs. 1 and 2, will be further considered. The paddle mechanisms thereof are rotated in the direction indicated by the arrows. This results in setting up four parallel rotating liquid cylinders. While the four liquid bodies in the four rectangular sections of the device will in the main rotate in the same general direction as the paddles, nevertheless, due to inertia, the frictional resistance of the sidewalls and the fluid in the corners, each body of liquid in a rectangular section will resist the swirl tendency and the paddles will tend to slip through the liquid to a greater or lesser extent thereby setting up local turbulence and eddy currents around the paddle blades. If feed is now introduced through channel F, a hydrostatic pressure is set up tending to move the solution towards the other end of the compartment B—1, that is, at right angles to the rotational plane of the paddles. The result of these two forces will be a helical flow and any particles entering at F will follow helical paths down the chamber B—1 and then flow across the opening E—1 (of the flow some will be straight across opening E—1 and some will be along a curving path across or through E—1) and thereafter will start spiraling again while passing "back" along chamber B—2. The operation is divided into steps or stages as the liquid continues along its sinuous or meandering path. It will thus be seen that a particle in traveling from point F to point G will progress very gradually through the basin and in so doing much of its flow path will be substantially a spiral path. At the head end of compartment B—2 the flow will meet a return flow of material from compartment B—3 coming through the submerged opening O—2 and will mingle therewith. The relatively large flocs in the return fluid from compartment B—3 tend to pick up and remove the smaller particles or flocs contained in the fluid from compartment B—1. Thus at each stage the partially flocculated fluid will be mixed with much more completely flocculated material from later or subsequent stages. The result will be a gradual stepwise stage flocculation of the solid matters contained in the feed. A close study of the other arrangements shown in Figs. 5 and 6 and 7 and 8 will show that most of the same general principles as above discussed have been applied in this case to a smaller number of paddle mechanisms, to wit, such for example as would be desirable in small plants. In Figs. 9 and 10 the flow is at right angles to the paddle shafts, that is, parallel to the planes of rotation. However, as in the other cases, the flocculation is divided into or carried out in a number of successive stages.

As a matter of fact, if there is selected for consideration any one section of or particle in the stream of liquid undergoing the flocculating operation, it will be noted that such selected section or particle will have a three-direction change of movement relative to each and all other particles in the flowing stream, or, as otherwise expressed, it will in effect have a horizontal component of movement relative to the other sections or particles in a direction of or paralleling the general direction of flow, it will have a horizontal component of movement relative to the other particles in direction transverse to the general direction of flow and it will also have a vertical component of movement relative to the other sections or particles in a direction transverse to the general direction of flow. This statement applies not only to the operating function of the apparatus of Figs. 1 and 2 but also to the apparatus of Figs. 5 and 6 and of the apparatus of Figs. 7 and 8.

There are being filed concurrently herewith, applications respectively entitled "Flocculation (Serial No. 27,015)" and "Flocculation (Serial No.

27,016)". These patent cases, Serial No. 27,015 and Serial No. 27,016, may be considered as complementary to each other and as complementary to this patent case Serial No. 27,014. The three applications for said patent cases, Serial No. 27,014, Serial No. 27,015 and Serial No. 27,016, have been filed as individual applications at this time in order to establish certain or proper lines of division or demarcation as between the several forms or embodiments of the invention which have been illustrated in the drawings that accompany said patent cases. The applications for the identified patent cases, Serial No. 27,014, Serial No. 27,015 and Serial No. 27,016, being all filed simultaneously, are to be viewed and treated as constituting component parts of an essentially main or general application.

We claim:

1. An apparatus for flocculation comprising a basin for holding liquid while undergoing flocculation, a feed therefor at one end and a discharge at the opposite end, a rotatable horizontally extending shaft, means for turning said shaft, paddles deriving support from said shafts and rendered operable by the turning of the shaft at rates enough to gently agitate the fluid undergoing flocculation in a manner conducive to floc coagmentation and at a rate adequate to maintain the solids matter therein in suspension but insufficient to interfere with floc formation, and baffles constituting partial partitions extending transversely of but only part way between the longitudinally extending side walls and dividing the basin into a series of transversely extending compartments longitudinally disposed one after the other thereby defining a meandering horizontal flow path through the basin said rotatable shaft being positioned so that the paddles thereupon function in a plurality of compartments.

2. An apparatus for flocculation comprising, in combination, a liquid holding basin having an intake portion and a submerged discharge portion, a number of longitudinally spaced transversely extending baffles within the basin each having at least one end terminating short of a side wall of the basin thereby providing round-the-end type of baffles constituting partial partitions dividing the interior of the basin into a series of meandering successive compartment sections between and in part defined by overlapping portions of adjacent partial partitions and arranged for directing the flow of liquid through the basin in a meandering but generally horizontal course; a plurality of horizontal paddles successively disposed in successive longitudinal compartment sections and operable about centers for producing a positive but gentle agitative effect on the liquid within the basin while flowing along the resulting meandering flow path as defined by the successive compartment sections, horizontally extending shafts, means carried by said shafts for supporting said paddles and means for imparting turning movement to said shafts and therethrough ultimately to said paddles.

3. An apparatus for flocculation comprising, in combination, a basin, a plurality of horizontal paddles and means for supporting said paddles and for effecting a continual turning of each paddle about a horizontally extending axis corresponding thereto, said basin having a feed leading to one end portion thereof and a submerged discharge leading from another end portion thereof, and successive transversely extending baffles therein providing partial partitions alternately extending from opposite side walls of the basin but only part way across the interior of the basin for dividing the basin into successive serially arranged communicating compartments which are in effect longitudinally disposed with one section behind the other and adapted to direct the flow of liquid along a meandering path as the liquid passes from the feed receiving portion of the basin through the communicating compartments and ultimately to and from the discharge portion of the basin, said paddles being located in successive longitudinal portions of the meandering path for the liquid as provided and defined by said baffles and operable within the liquid for producing upon the liquid within and flowing along said meandering path gentle agitative effects conducive to floc coagmentation and amassment.

4. An apparatus for flocculation comprising, in combination, a basin wherein a liquid is held while being subjected to a flocculation operation having a feed leading to one end portion thereof and a discharge leading from another end portion thereof; a plurality of parallel horizontally extending shafts, sets of paddles that derive support from said shafts but which are spaced from the shafts and disposed so as to operatively function within the basin as well as being operable so as to gently agitate the liquid in the basin, means for imparting turning movement to said shafts, and their paddles at a velocity adequate to maintain suspended matter in suspension but insufficient to interfere with the formation of flocs and in a manner conducive to the coagmentation of flocs, and longitudinally spaced transversely extending baffles providing partial partitions located between successive longitudinally spaced sets of paddles for dividing the basin into a series of transversely extending sub-compartments that are in communication with each other through the space left by said partial partitions, said baffles being positioned so as to extend upwardly from the bottom of the basin and transversely from one side portion of the basin but terminating so as to be spaced from the opposite side portion of the basin thereby leaving a communicating passageway between the compartments located at opposite sides of the baffles, said baffles being positioned so that the communicating passageways are successively disposed adjacent opposite portions of the basin.

5. An apparatus as defined in and by claim 4 wherein the paddles are rotatably mounted in a manner whereby at the top of their rotational cycle the direction of motion of the paddle is in the same general direction as that of the general flow of liquid within the basin from the inflow feed portion of the basin to the outflow discharge portion of the basin and whereby at the bottom of their rotational cycle the direction of motion of the paddle is counter to that of the general flow, and wherein the baffles are provided with bottom openings therethrough located at ends thereof opposite the ends whereat the communicating passageways are provided.

6. An apparatus for flocculation comprising a rectangular basin for holding liquid while undergoing flocculation, a feed therefor at one end and a discharge at the opposite end, a rotatable horizontally and longitudinally extending shaft, paddles deriving support from said shaft rendered operable by turning the shaft at a rate enough to gently agitate the fluid undergoing flocculation in a manner conducive to floc coagmentation and at a rate adequate to maintain the solid matter therein in suspension but insufficient to interfere with floc formation, motivating mechanism for turning said shaft, and baffles constituting partial partitions extending transversely between the longitudinally extending walls of the basin dividing the basin into a series of communicating compartments that define a meandering horizontal flow path through the basin; said rotatable shaft being operatively disposed so that the paddles function in a plurality of said compartments.

7. An apparatus for flocculation comprising a basin for holding liquid while undergoing flocculation, a feed therefor at one end, a discharge therefor at the opposite end, horizontally and transversely extending shafts, paddles deriving support from said shafts operable slowly enough to gently but positively agitate the fluid undergoing flocculation in a manner conducive to floc coagmentation at a velocity insufficient to interfere with floc formation but at a velocity adequate to maintain in suspension the solid matter in liquid, power actuated motivating means from which the paddles derive the forces for their operative movements and baffles constituting partial partitions extending transversely of and located between longitudinally extending walls of the basin for dividing the basin into a series of transversely extending communicating compartments in successive longitudinal disposition one behind the other and defining a sinuous flow path through the basin which set of paddles is disposed so as to operatively function some in one of said compartments and others in a subsequent compartment.

8. An apparatus for flocculation, comprising basin for holding liquid while undergoing flocculation, a feed therefor at one end thereof, a discharge therefor at the opposite end thereof, a horizontally and longitudinally extending shaft, longitudinally extending paddles deriving support from said shaft, means for actuating said shaft and its paddles slowly enough to gently but positively agitate fluid undergoing flocculation in a manner conducive to floc coagmentation but at a velocity insufficient to interfere with floc formation as well as at a velocity adequate to maintain in suspension solid matter in liquid, and transverse baffles constituting partial partitions located between the longitudinally extending side walls of the basin but extending only part of the distance from side wall to side wall thereby providing round-the-end type of baffles arranged for dividing the basin into a series of communicating compartments defining a meandering horizontal flow path through the basin, which said paddles are disposed so as to operatively function in a plurality of successive compartments.

9. An apparatus as defined in and by claim 8 according to which there are a plurality of parallel horizontal shafts and a plurality of sets of parallel paddles deriving support from said shafts and disposed to simultaneously operatively function in a plurality of successive compartments.

10. An apparatus for flocculation comprising a basin for holding liquid while undergoing flocculation, a feed therefor at one end and a discharge at the opposite end, rotatable longitudinally and horizontally extending parallel shafts, means for simultaneously rotating the shafts, a plurality of sets of paddles deriving support from each of said shafts and rendered operable by the rotating of the shafts at velocities to gently agitate the fluid undergoing flocculation in a manner conducive to floc coagmentation and adequate to maintain the solids matter therein in suspension, but insufficient to interfere with floc formation, and baffles constituting partial partitions extending transversely between the longitudinally extending side walls for dividing the basin into a longitudinally disposed series of transversely extending sub-compartments that define a meandering flow path through the basin, the sets of paddles on each said rotatable shaft being disposed along the shaft so that they function in a plurality of said sub-compartments.

11. In the performing of a flocculation operation on liquid having therein matter susceptible to floc coagmentation and amassment as the result of agitative force effects upon the liquid, the method which comprises directing a body of flowing liquid undergoing flocculation along a sinuous flow path whereby a meandering stream results, imparting to the liquid in successively disposed zones of the sinuous flow path and particularly to the liquid sections in the lower portions of said zones positive forces having components directed laterally to the general flow path of the liquid in the zone to which the particular force is applied whereby gentle agitative effects conducive to floc coagmentation are realized so that there results a swirling action in the particular zone of a character to maintain the solids in suspension and to cause lower portions of the flow stream to move into the upper portions thereof and vice versa and whereby there is a consequent passing of liquid having flocs in suspension therein from one zone into the succeeding zone as the liquid progresses along the sinuous flow path therefor.

12. In the performing of a flocculation according to the method defined in and by the claim 11, the causing of a localized back flow from a lower portion of a subsequent zone of a meandering stream to and into the lower portion of a preceding zone whereby there is a passing of a quantity of liquid with flocs in suspension therein from the subsequent zone to and into the preceding zone.

13. The method of flocculation which comprises directing liquid while undergoing flocculation along a relatively horizontally extending sinuous flow path provided by a communicating series of parallel rectangularly defined flocculation compartments; and by means of paddles located in the sinuous flow path functioning in the liquid within said compartments and movable in vertical planes about submerged horizontally extending axes, inducing relatively uniform agitative effects of an intensity to maintain a substantial homogeneous suspension within the liquid but insufficient to interfere with floc formation therein so that due to the combined effect of the mode of flow and the agitative effects of the paddles there are realized progressive three-direction movement changes within the successive sections of the liquid undergoing flocculation within the sinuous flow paths.

GEORGE M. DARBY.
ELLIOTT J. ROBERTS.
WILLIAM C. WEBER.